United States Patent
Dentler et al.

(12) 
(10) Patent No.: US 6,289,368 B1
(45) Date of Patent: Sep. 11, 2001

(54) METHOD AND APPARATUS FOR INDICATING THE STATUS OF ONE OR MORE COMPUTER PROCESSES

(75) Inventors: Brian Pershing Dentler, Herman; Alan D. Johnson, Omaha; Michael A. Dunn, deceased, late of Omaha, all of NE (US), by Jane Dunn, executrix

(73) Assignee: First Data Corporation, Hackensack, NJ (US)

( * ) Notice: Subject to any disclaimer, the term of this patent is extended or adjusted under 35 U.S.C. 154(b) by 0 days.

(21) Appl. No.: 08/773,029

(22) Filed: Dec. 24, 1996

Related U.S. Application Data

(60) Provisional application No. 60/009,422, filed on Dec. 27, 1995.

(51) Int. Cl.$^7$ .................................................. G06F 15/40
(52) U.S. Cl. ............................................ 709/101; 709/106
(58) Field of Search ........................ 395/200.53, 200.54, 395/200.32, 680; 364/550, 518, 900; 345/118; 709/200, 203, 100, 101, 223, 224, 106; 710/19, 267; 705/36

(56) References Cited

U.S. PATENT DOCUMENTS

| | | | |
|---|---|---|---|
| 4,348,739 | * | 9/1982 | Deaver et al. ................... 364/900 |
| 4,375,079 | * | 2/1983 | Ricketts et al. ................. 364/518 |
| 4,588,987 | * | 5/1986 | Stephens ........................ 340/525 |
| 4,858,152 | * | 8/1989 | Estes ............................ 364/550 |
| 5,161,103 | * | 11/1992 | Kosaka et al. .................... 705/36 |
| 5,675,798 | * | 10/1997 | Chang ........................... 395/680 |
| 5,724,584 | * | 3/1998 | Peters et al. ................... 709/101 |
| 5,734,831 | * | 3/1998 | Sanders ...................... 395/200.53 |
| 5,758,071 | * | 5/1998 | Burgess et al. ............... 395/200.5 |
| 5,761,429 | * | 6/1998 | Thompson .................. 395/200.54 |
| 5,761,655 | * | 6/1998 | Hoffman ........................... 707/4 |
| 5,764,913 | * | 6/1998 | Jancke et al. ............... 395/200.54 |
| 5,768,508 | * | 6/1998 | Eikeland .................... 395/200.32 |
| 5,768,523 | * | 6/1998 | Schmidt ..................... 395/200.59 |
| 5,826,104 | * | 10/1998 | Rifkin ........................... 710/15 |

* cited by examiner

Primary Examiner—Majid Banankhah
(74) Attorney, Agent, or Firm—Brinks Hofer Gilson & Lione

(57) ABSTRACT

A method and apparatus for graphically indicating the status of one or more computer processes. The processes can be batch or online processes, which can be scheduled for, executing or abended on a mainframe computer or distributed computer system. Flowcharts or milestone charts are provided to graphically display to the user the status of one or more processes. Information regarding the relationships between processes is also provided. Color may be employed to indicate the status of a particular process. A preferred embodiment employs a client/server architecture. A message stream of process status is provided to the application server from the mainframe or distributed computer system.

21 Claims, 20 Drawing Sheets

Microfiche Appendix Included
(9 Microfiche, 792 Pages)

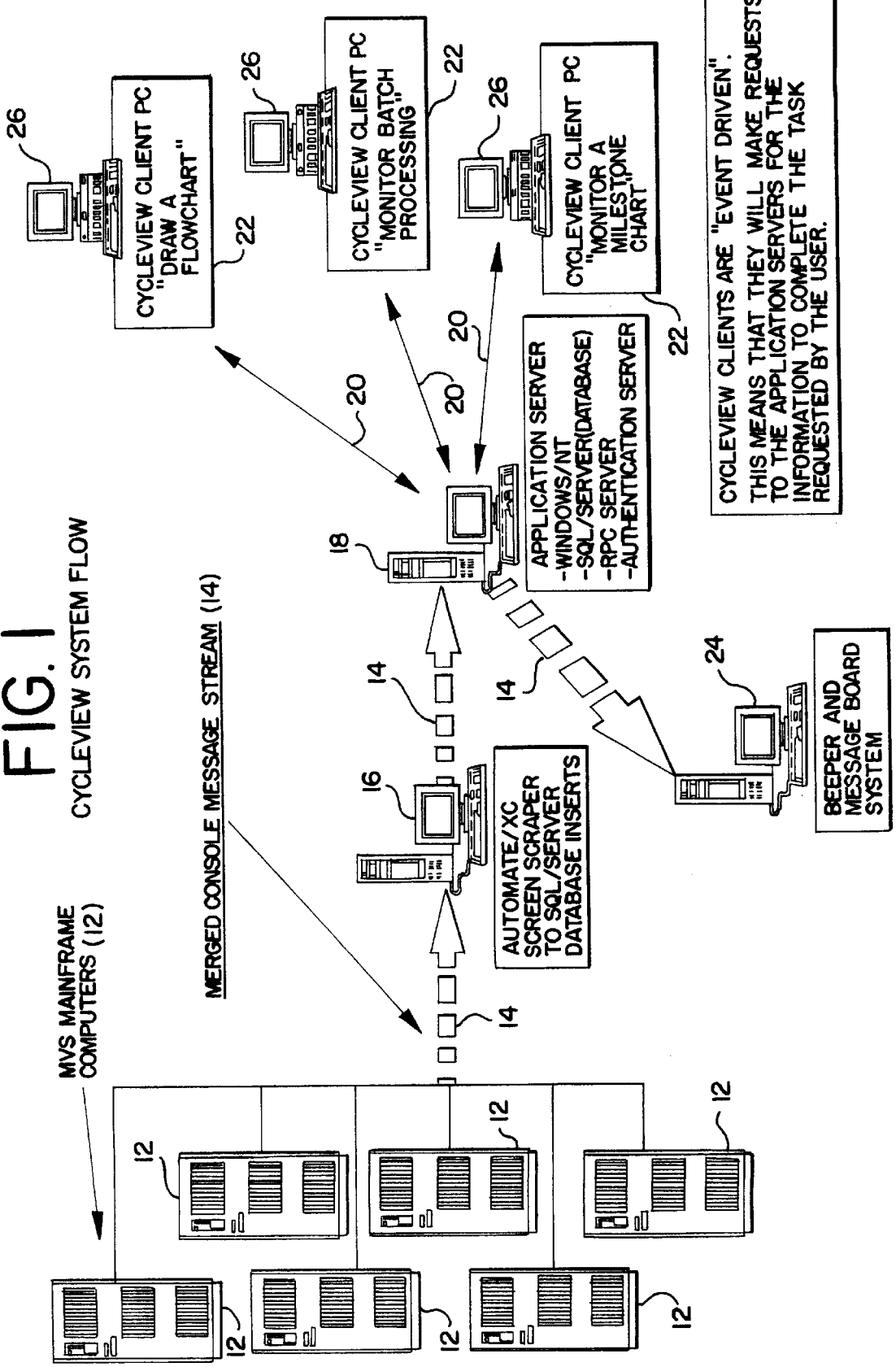
FIG. 1 CYCLEVIEW SYSTEM FLOW

CYCLEVIEW CLIENT TO SERVER REQUESTS

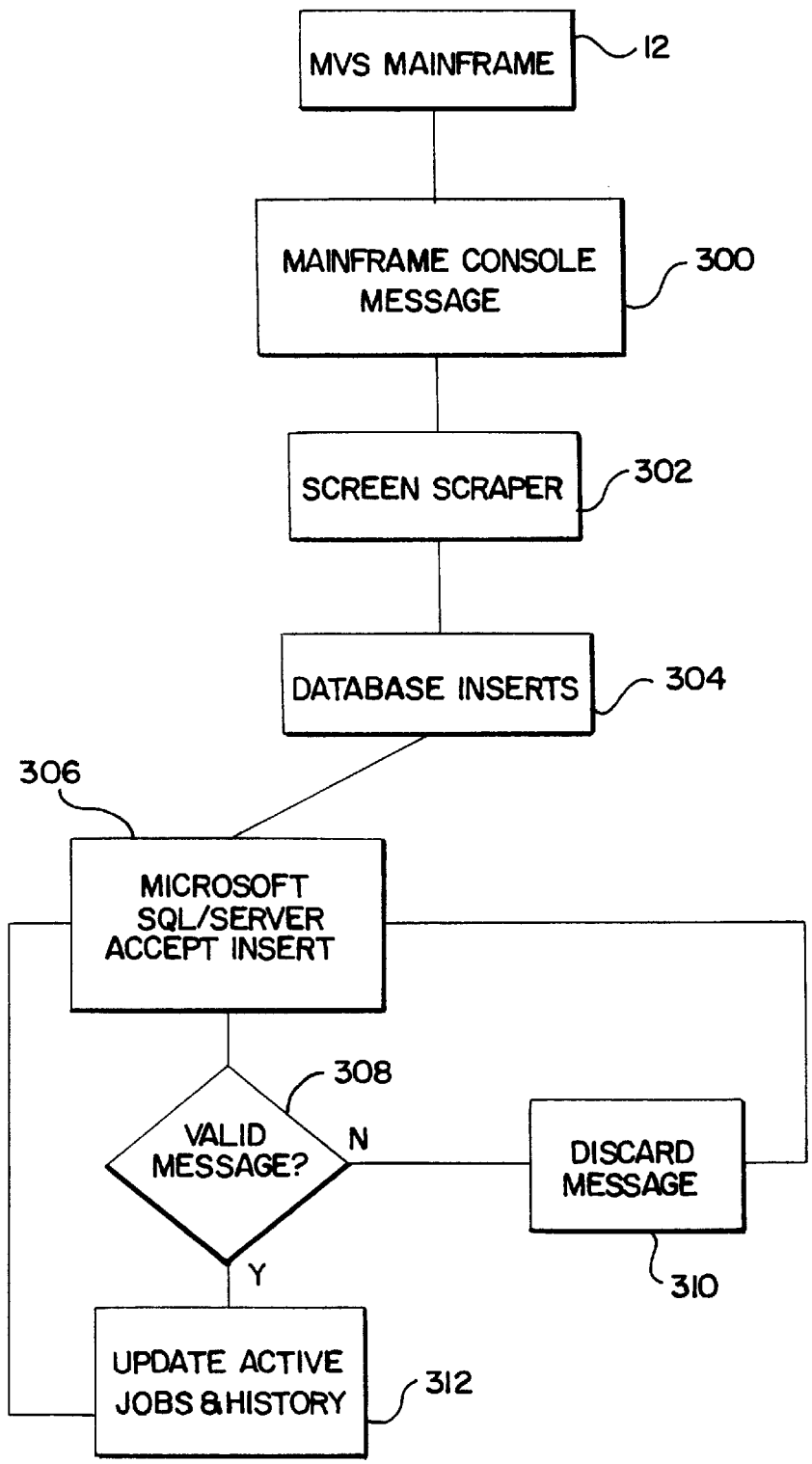

FIG. 7(b)

| WAITING (43) | | | EXECUTING (59) | | | ABENDED (17) | | |
|---|---|---|---|---|---|---|---|---|
| ABD4JSS | SYS | 11:50:15::10/17/96 | * FME9305 | SYS | 11:56:21::10/17/96 | PCHD0466 | SYS N/A | 11:50:20:10/17/96 |
| CPD2A26 | SYS | 11:50:14::10/17/96 | * FRD2CH3 | SYS | 11:55:52::10/17/96 | KCHDI125 | SYS JCL | 11:11:59 :10/17/96 |
| CPD2A27 | SYS | 11:50:14::10/17/96 | * ABD2MAW | SYS | 11:55:36::10/17/96 | KABE9005 | SYS SD00 | 11:10:16 :10/17/96 |
| INDOO11 | SYS | 11:50:14::10/17/96 | * RMDO325 | SYS | 11:55:34::10/17/96 | CHD2NP3 | SYS N/A | 11:10:13 :10/17/96 |
| INDO10B | SYS | 11:50:14::10/17/96 | * FJAM43148 | SYS | 11:55:02::10/17/96 | FJAM4120 | SYS N/A | 11:00:10 :10/17/96 |
| LCHD2AI3 | SYS | 11:50:14::10/17/96 | LCHD9AI3 | SYS | 11:53:15::10/17/96 | FJAM4I09 | SYS N/A | 11:00:09 :10/17/96 |
| RMD0530 | SYS | 11:50:14::10/17/96 | * RMD3266 | SYS | 11:52:35::10/17/96 | JCID0530 | SYS N/A | 11:00:09 :10/17/96 |
| RMD0661 | SYS | 11:50:14::10/17/96 | CVR9I4EH | SYS | 11:51:51::10/17/96 | IND0025 | SYS S000 | 09:40:20:10/17/96 |
| RMD0670 | SYS | 11:50:14::10/17/96 | * CVR9I4EG | SYS | 11:51:48::10/17/96 | YMA3031W | SYS N/A | 09:10:14 :10/17/96 |
| RMD0725 | SYS | 11:50:14::10/17/96 | FJAM4321 | SYS | 11:50:19::10/17/96 | PSMD0000 | SYS S000 | 08:52:35 :10/17/96 |
| RMD0750 | SYS | 11:50:14::10/17/96 | * RMD0590 | SYS | 11:48:52::10/17/96 | * PCHD0469 | SYS S000 | 08:50:13 :10/17/96 |
| ABD2FNB | SYS | 11:50:13::10/17/96 | * RMD0650 | SYS | 11:48:46::10/17/96 | PSMD0081 | SYS N/A | 17:40:06 :10/16/96 |
| CPD2A24 | SYS | 11:50:13::10/17/96 | * FME9205 | SYS | 11:48:25::10/17/96 | DFME9314 | SEC N/A | 07:00:26:10/15/96 |
| CPD2A25 | SYS | 11:50:13::10/17/96 | CHD0373 | SYS | 11:43:16::10/17/96 | DMBD0060 | SEC N/A | 07:00:26 :10/15/96 |
| LABD2A22 | SYS | 11:50:13::10/17/96 | TPD2BSE | SYS | 11:42:57::10/17/96 | XMAWVSAM | SYS N/A | 03:40:00 :10/14/96 |
| RMD0651 | SYS | 11:50:13::10/17/96 | CHD9BNI | SYS | 11:42:52::10/17/96 | XMAELDVI | SYS N/A | 2I:00:II :10/10/96 |
| RMD0660 | SYS | 11:50:13::10/17/96 | * RMD0460 | SYS | 11:39:4I::10/17/96 | XMAELODV | SYS N/A | 13:50:10 :10/10/96 |
| ZINDO006 | SYS | 11:50:13::10/17/96 | * RMD0305 | SYS | 11:36:50::10/17/96 | | | |
| ZRMR9075 | SYS | 11:50:13::10/17/96 | * RMD0236 | SYS | 11:36:32::10/17/96 | | | |
| DCD0025 | SYS | 11:50:12::10/17/96 | * RMD0300 | SYS | 11:36:32::10/17/96 | | | |

FIG. 9

CUSTOM JOBS MONITOR

ADD JOB TO LIST

JOB NAME: [DCHD0100]   JES SYSTEM: [SECOND JES (SECA)] →

[ADD JOB]  [CLOSE]

JOB

| NAME | JES SYSTEM | SEC | AVERAGE JOB RUN | | | LAST JOB RUN | | | | |
|---|---|---|---|---|---|---|---|---|---|---|
| | | | START | END | DURATION | DATE | START | END | DURATION | SUBSYSTEM CHASE |
| DCHD0100 | | | 18:32 | 18:32 | 00:01 | 10/15/96 | 18:32 | 18:32 | 00:01 | |
| ZSGD0004 | SYS | | 02:11 | 02:12 | 00:01 | 10/16/96 | 04:28 | 04:29 | 00:01 | MEXICO |
| ZTPD0025 | SYS | | 00:50 | 00:52 | 00:01 | 10/15/96 | 23:46 | 23:49 | 00:02 | MEXICO |
| ZTPD0050 | SYS | | 00:55 | 00:55 | 00:01 | 10/15/96 | 23:51 | 23:51 | 00:01 | MEXICO |

[REMOVE JOB]
[VIEW ALL RUNS]
[CONNECTIONS]
[LOAD LIST]
[SAVE LIST]
[PRINT]
[PRINT DETAIL LIST]
[HELP]

FIG. 10

JOB RUNS BY DATE — 100

REQUEST PARAMETERS

JOB NAME: AME91* — 102

COMPLETION DATE: OCT 16, 1996

JES SYSTEM: SYSTEM A (SYSA)

UPDATE
CLOSE

JOB INFORMATION

| JOB NAME | JES SYSTEM | START DATE | START TIME | END DATE | END TIME | DURATION | ABEND CODE |
|---|---|---|---|---|---|---|---|
| AME9130 | SYS | 10/16/96 | 00:04 | 10/16/96 | 00:06 | 00:02:42 | |
| AME9130 | SYS | 10/16/96 | 02:04 | 10/16/96 | 02:09 | 00:04:55 | |
| AME9130 | SYS | 10/16/96 | 10:05 | 10/16/96 | 10:07 | 00:01:48 | |
| AME9130 | SYS | 10/16/96 | 12:04 | 10/16/96 | 12:08 | 00:04:03 | |
| AME9140 | SYS | 10/16/96 | 02:59 | 10/16/96 | 03:05 | 00:05:49 | |
| AME9141 | SYS | 10/16/96 | 03:06 | 10/16/96 | 03:07 | 00:01:13 | |
| AME9142 | SYS | 10/16/96 | 03:06 | 10/16/96 | 03:07 | 00:01:29 | |
| AME9143 | SYS | 10/16/96 | 03:08 | 10/16/96 | 03:11 | 00:03:00 | |
| AME9144 | SYS | 10/16/96 | 02:59 | 10/16/96 | 02:59 | 00:00:02 | |
| AME9146 | SYS | 10/16/96 | 02:59 | 10/16/96 | 02:59 | 00:00:08 | |
| AME9148 | SYS | 10/16/96 | 03:12 | 10/16/96 | 03:13 | 00:00:41 | |

104 — START DATE
106 — START TIME
108 — END DATE
110 — END TIME
112 — DURATION
114 — ABEND CODE

PRINT SELECTED
PRINT ALL
HELP

FIG. 14

```
┌─────────────────────────────────────────────────────────┐
│              ADD/MODIFY MILESTONE                        │
├─────────────────────────────────────────────────────────┤
│ ┌─MILESTONE INFORMATION─────────────────────┐            │
│ │      MILESTONE NAME: [CRITCAL JOB.1    ]  │  [ ADD  ] │
│ │  198                                      │            │
│ │     TRIGGERING JOBNAME: [CHD0100      ]   │  [CLOSE ] │
│ │  200                                      │            │
│ │         JES SYSTEM: [SYSTEM A (SYSA) ▼]   │  [HELP  ] │
│ │                                           │            │
│ │       TARGET START TIME: [18:37]          │            │
│ │   202                                     │            │
│ │         TARGET END TIME: [18:38]          │            │
│ │    204                                    │            │
│ │  MINUTES LATE FOR ALERT: [30]             │            │
│ │  206                                      │            │
│ └───────────────────────────────────────────┘            │
│                                                          │
│ ┌─ALERT INFORMATION─────────────────────────┐            │
│ │    208  ALERT TYPE: [TELEPHONE BEEPER NOTIFY ▼]       │
│ │  210                                      │            │
│ │  MESSAGE DESTINATION(S): [MYBEEPERNAME ]  │            │
│ │  ┌─ALERT MESSAGE─────────────────────┐    │            │
│ │  │ [CHD0100 IS LATE!              ]  │    │─212       │
│ │  └───────────────────────────────────┘    │            │
│ └───────────────────────────────────────────┘            │
│                                                          │
│ ┌─HISTORY INFORMATION───────────────────────┐            │
│ │              214          218             │            │
│ │   LAST START: [18:39]  LAST END: [18:40]  │ [JOB HISTORY]│
│ │                                           │            │
│ │  AVERAGE START: [18:37] AVERAGE END:[18:38]│ [RESET]   │
│ │                  216              220     │            │
│ └───────────────────────────────────────────┘            │
│                     196                           190    │
└─────────────────────────────────────────────────────────┘
```

FIG. 15

MILESTONE CHART EDITOR - C:\CYCLEVIEW\AMEX530.MLS

| MILESTONE NAME | TRIGGER JOB | JES SYSTEM | TARGET START | TARGET END | ALERT DELAY | ACTION TYPE |
|---|---|---|---|---|---|---|
| AMEX | | SYS | | | | |
| AME9140 | AME9140 | SYS | 03:01 | 03:06 | 30 | NONE |
| AME9141 | AME9141 | SYS | 03:08 | 03:09 | 30 | NONE |
| AME9142 | AME9142 | SYS | 03:08 | 03:10 | 30 | NONE |
| AME9143 | AME9143 | SYS | 03:11 | 03:13 | 30 | NONE |
| AME9143 | AME9143 | SYS | 03:11 | 03:13 | 30 | NONE |
| AME9143 | AME9143 | SYS | 03:11 | 03:13 | 30 | NONE |
| AME9148 | AME9148 | SYS | 03:14 | 03:15 | 30 | NONE |
| AME9148 | AME9148 | SYS | 03:14 | 03:15 | 30 | NONE |
| AME9148 | AME9148 | SYS | 03:14 | 03:15 | 30 | NONE |
| AME3110 | AME3110 | SYS | 03:19 | 03:19 | 30 | NONE |
| AME3111 | AME3111 | SYS | 03:19 | 03:19 | 30 | NONE |
| AME3112 | AME3112 | SYS | 03:19 | 03:20 | 30 | NONE |
| AMM7010 | AMM7010 | SYS | 06:01 | 06:58 | 30 | NONE |
| AMW6010 | AMW6010 | SYS | 06:15 | 06:22 | 30 | NONE |
| AME9230 | AME9230 | SYS | 18:07 | 18:08 | 30 | NONE |

CYCLE START TIME: 00:00

[OPEN] [SAVE] [ADD/MODIFY] [REMOVE] [SET CYCLE START] [CLOSE] [HELP]

METHOD AND APPARATUS FOR INDICATING THE STATUS OF ONE OR MORE COMPUTER PROCESSES

This application claims priority to copending U.S. provisional application Ser. No. 60/009,422, filed Dec. 27, 1995.

A Microfiche Appendix consisting of 9 sheets (792 total frames of microfiche is included in this application. The Microfiche Appendix contains material which is subject to copyright protection. The copyright owner has no objection to the facsimile reproduction by any one of the Microfiche Appendix, as it appears in the Patent and Trademark patent files or records, but otherwise reserves all copyright rights whatsoever.

FIELD OF THE INVENTION

This invention relates to tracking one or more processes scheduled for execution on a computer system, and more particularly, to a method and apparatus for graphically displaying a visual representation of the status of one or more batch processes.

BACKGROUND OF THE INVENTION

For years, large multi-purpose computer systems have been used for processing or executing many different transactions, processes and programs initiated or requested by one or more users. Traditionally, the transactions executed on these large computer systems fall into two broad categories. The first category comprises "real-time" transactions, which refers to transactions that are responded to and handled as soon as they occur. The second category is called "batch" transactions, which are generally processed some time period after they are initiated or requested by a user. In the typical computer environment, the batch transactions are saved to be processed overnight while the system is undergoing minimum utilization. In this manner, the results of the batch transactions can be available the next morning for interpretation or use.

In large distributed computer networks, the real-time transactions can be serviced by programs called "onlines", that are programs which may support customer or end user applications or environments. Transactions that are processed in this manner are recorded for later use in what has been referred to as the "cycle" of the computer. When the batch transactions are processed they are included directly into the cycle, along with the real-time or online transaction. In order to obtain an accurate picture of the status of the computer system at any given time it is important to account for all of the transactions together, for example, when individual client accounts are updated. This process of updating account status if done incorrectly may produce the undesirable situation where charges may be posted before payments in a customer's account, which could temporarily make an account look different than it really is.

The cycle is thus a large collection of programs which process the transaction activity from the input sources of a large computer system in order to update accounts, create current screens and reports for clients, create statements and perform financial settlement with other computer systems and networks. Cycles can be subdivided into suites called "jobs" where each job can contain multiple programs called "steps." Closely related programs that depend on each other are often grouped together into the same job. A typical large computer system, therefore, can have hundreds of jobs that are executed on a daily basis. In such highly complex computer systems, the execution and scheduling of jobs may even be handled by a scheduling program that ensures that jobs are processed at the correct time and in the correct order. Obtaining status information at any given time on such complex computer systems has been a difficult endeavor.

Attempts have been made to determine and track the status of the many jobs and cycles executing on large computer systems. For example, manually generated flowcharts of system processes have been prepared in order to track the processes scheduled for, executed and completed on large computer systems at any given time. However, as the number of processes increases, these manually generated flowcharts become increasingly difficult and time consuming to create, and virtually impossible to maintain on a dynamic basis. Nevertheless, when system problems arise, such flowcharts are an invaluable management tool to correct any errors or problems with the system. One attempt at such manually generated flowcharts used a technique of color-coding the status of a job or process that would indicate when the process started, ended or abended. These hand drawn charts thus presented the status of the system at a given time in a visual fashion for the user.

As can be imagined, as the number and complexity of processes running on a computer increases, the above manual status approach quickly becomes difficult to maintain. In this era of expanding use of computers to perform many laborious tasks, it would be advantageous to have a program to continually monitor the status of the various processes executing on a given computer. Due to the complexity of monitoring the status of many hundreds of processes handled by a large computing system, however, one computer alone may not be sufficient to supply the computing power necessary to execute a program that provides this information to the user. Moreover, existing software operating systems do not provide sufficient architecture to handle large scale flowcharting of computing processes.

The prior art lacks the advantage of providing a real-time graphical representation of the status of one or more processes executing on a computer system. Such a display would preferably include flowcharts of currently scheduled, executing and completed processes on the computer system, which may also be color-coded to readily and visually reflect such status. Processes that stem from or trigger other processes would be also visually represented to the user. The program for providing such a graphical display would be capable of execution over a distributed computer system thus allowing for increased response time and distributed utilization of the system's resources. Accordingly, the user can observe on a personal computer attached to a mainframe computing system the status of any process handled by the mainframe computer.

SUMMARY OF THE INVENTION

In view of the above, the present invention provides a method and apparatus for indicating the status of one or more batch processes on a computer system. According to the system of the invention, a mainframe computer is provided having a central processor for executing batch processes initiated from a user. Means coupled to the mainframe computer are provided for tracking the status of a batch process and generating a signal indicative of that status. A display coupled to the mainframe computer is configured to receive the signal indicative of the process status and graphically display such status to the user. In a preferred embodiment of the system, the mainframe computer can be a central computer or a distributed computer system with multiple processing elements. The graphical display is preferably presented in the form of a flowchart or milestone chart.

According to the method of the invention, a mainframe or central computer is provided having a central processor for executing batch processes initiated from the user. The method tracks the status of the batch process and generates a signal indicative of such status. The signal is then received and used to graphically display the status of the batch process to the user.

In another aspect of the invention, a graphic user interface is provided for visually communicating the status of batch processes for execution on a computer. The graphic user interface includes a main screen for visually displaying the status of at least one process. A dialog box is also provided that allows a user to create a chart visually identifying the at least one process on the computer. A graphical representation of the process is provided in the user interface including links identifying where one process is related to another process on the computer. According to a preferred embodiment of the invention, the chart can be a flowchart or a milestone chart showing the status of processes that execute on the computer.

From the present invention, a user can readily visualize the current status of any process executing on a large computer system. Through of use of distributed processing, such status can be provided to the user in a graphical format in real-time. Presenting the status of one or more processes executing on a computer in a flowchart or milestone chart format readily identifies the relationship that may exist between processes. According to the invention, the user can thus obtain mainframe information from a remote personal computer work station regarding the status of a job submitted for execution on the mainframe. The invention also provides the advantage of monitoring and tracking product performance on the computer system. Such an advantage enables the user to monitor past, current and forecasted product performance in a graphical list, flowchart or milestone chart format.

These and other features and advantages of the invention will become apparent upon a review of the following detailed description of the presently preferred embodiments of the invention, taken in conjunction with the appended drawings.

BRIEF DESCRIPTION OF THE DRAWINGS

FIG. 1 is a system block diagram of one presently preferred embodiment of the invention;

FIG. 2 is one presently preferred flowchart of the functions and processes for implementing the invention, where FIG. 2(c) shows the flow of messages from a mainframe computer;

FIG. 3 is one presently preferred main screen of a graphical user interface of the invention, where

FIG. 7 illustrates a preferred active jobs monitor where

FIG. 9 shows a custom jobs monitor display;

FIG. 10 shows a historical job runs display;

FIG. 14 illustrates an add/modify milestone dialog box;

FIG. 15 illustrates a milestone chart editor;

DETAILED DESCRIPTION OF THE PRESENTLY PREFERRED EMBODIMENTS

Figure 2A:
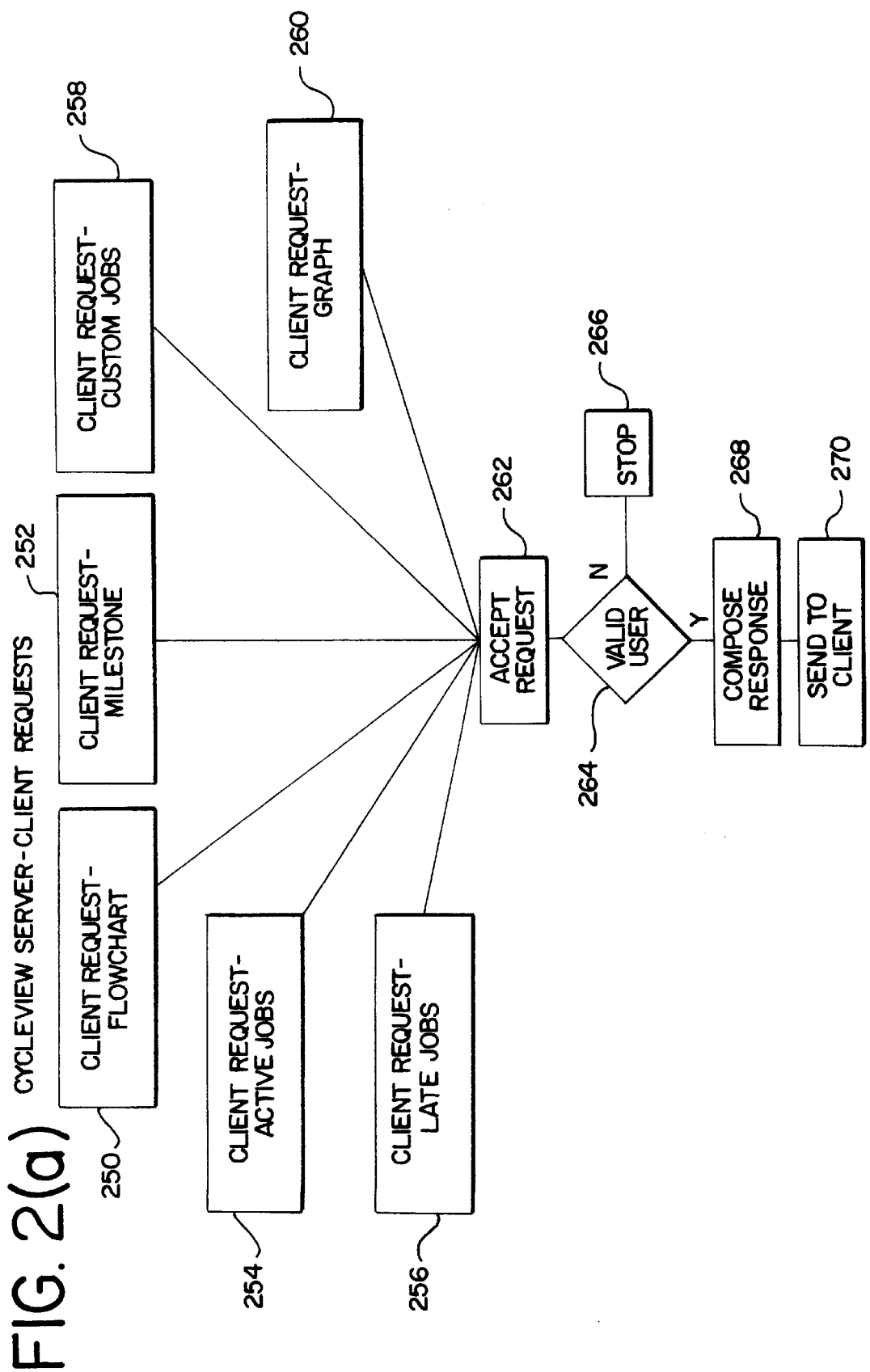
FIG. 2(a) shows the flow of client requests.

Referring to the drawings, where like reference numerals refer to like objects throughout, a distributed computer system according to one presently preferred embodiment of the invention is generally designated at 10. According to the preferred embodiment, the distributed computer system 10 includes one or more mainframe computers 12. The mainframe computers 12 preferably comprise MVS mainframe computers, which can be grouped together and located at a single site or distributed among two or more sites. In the preferred embodiment, a total of seven mainframes 12 are located in Omaha, Nebr., which mainframes 12 serve as a national distributed computer system 10.

The mainframe computers 12 are busy executing many processes each day according to their programming. As more mainframe computers 12 are hooked together, therefore, the processing ability of the mainframe computer combination increases substantially. In order to track the many processes executing on the mainframe computers 12, a merged console message stream 14 is provided. The merged console message stream 14 is a collection of all of the status information provided to the consoles (not shown) attached to the mainframe computers 12. These consoles (not shown) are typically monitored by system administrators or operators in a manner generally known in the art.

As shown in FIG. 1, the merged console message stream 14 is communicated or coupled to a monitoring computer 16. The monitoring computer 16 functions as a preprocessor to collect and arrange the message stream for communication to one or more application servers 18. According to the preferred embodiment of the invention, the monitoring computer 16 comprises an IBM Corporation OS/2 workstation running the Automate program manufactured by Computer Associates or Legent Corporation.

In the distributed computer system 10, one or more application servers 18 are provided according to a client/server model generally known in the art. The provision of more than one application server 18 is dictated by the particular needs of a specific installation, but also provides for and allows reductant backup should one of the application servers 18 go down for maintenance or repair.

In the preferred embodiment of the invention, the application server 18 is a personal computer with an Intel Pentium/75 microprocessor, 16 megabytes of RAM memory, a 540 megabyte hard drive, and a token ring card. A video card capable of 1,024×768 pixels @ 256 colors and a 15-inch color monitor is also provided. The application server 18 is preferably capable of TCP/IP communication over a wide area network, including the Internet. The application server 18 preferably executes the Microsoft Corp. Windows/NT version 3.51 operating system. The application server 18 preferably includes a database such as the Microsoft Corp. SQL/server database. As will be explained in more detail below, to facilitate communication to the client personal computers ("PC's") 22 the application server 18 is capable of handling remote procedure calls in a manner generally known in the art.

Communication to one or more client PC's 22 is established through a communication link 20. In one preferred embodiment of the invention, the communication link 20 consists of a local area network. The communication link 20 is also preferably capable of supporting TCP/IP communications as well as handling remote procedure calls from the client PC's 22. As those skilled in the art will appreciate, in the preferred embodiment the client PC's 22 are event driven and thus make requests of the application server 18 on an as needed basis for information necessary to complete a task running on a client PC 22. In the preferred embodiment, the client PC's 22 include the same hardware configuration as the application server 18. Additionally, the client PC's 22 support the same operating system (Windows/NT version 3.51) that is executing on the application server 18. As will be explained in more detail below in connection with one presently preferred computer program supporting the invention, users operate the client PC's 22 to obtain process status by drawing a flowchart, monitoring batch processing or monitoring a milestone chart.

Also shown in FIG. 1 is a message board computer system 24. The message board computer system 24 is coupled to the application server 18 to receive the merged console message stream 14. As described in more detail below, the merged console message stream 14 can comprise information from more than one mainframe computer system. The message board computer system 24 thus serves as a message board for the processing activity occurring on the mainframe computers 12. The message board computer system 24 preferably alerts a system administrator of the occurrence of certain events through an audible tone, visual display or other form of status identification.

In one aspect of the invention, a computer program is used to implement the method of indicating the status of one or more computer processes. One presently preferred flowchart providing an overview of such computer program and its functions is provided in FIGS. 2(*a*)–2(*c*). A preferred computer program following the procedures and functions shown in FIGS. 2(*a*)–2(*c*) is provided in the Microfiche Appendix. The presently preferred computer program is written in the C$^{++}$ computer language although, as those skilled in the art will appreciate, the flowchart shown in FIGS. 2(*a*)–2(*c*) can be implemented in any computer language without departing from the spirit and scope of the invention.

Figure 2B:
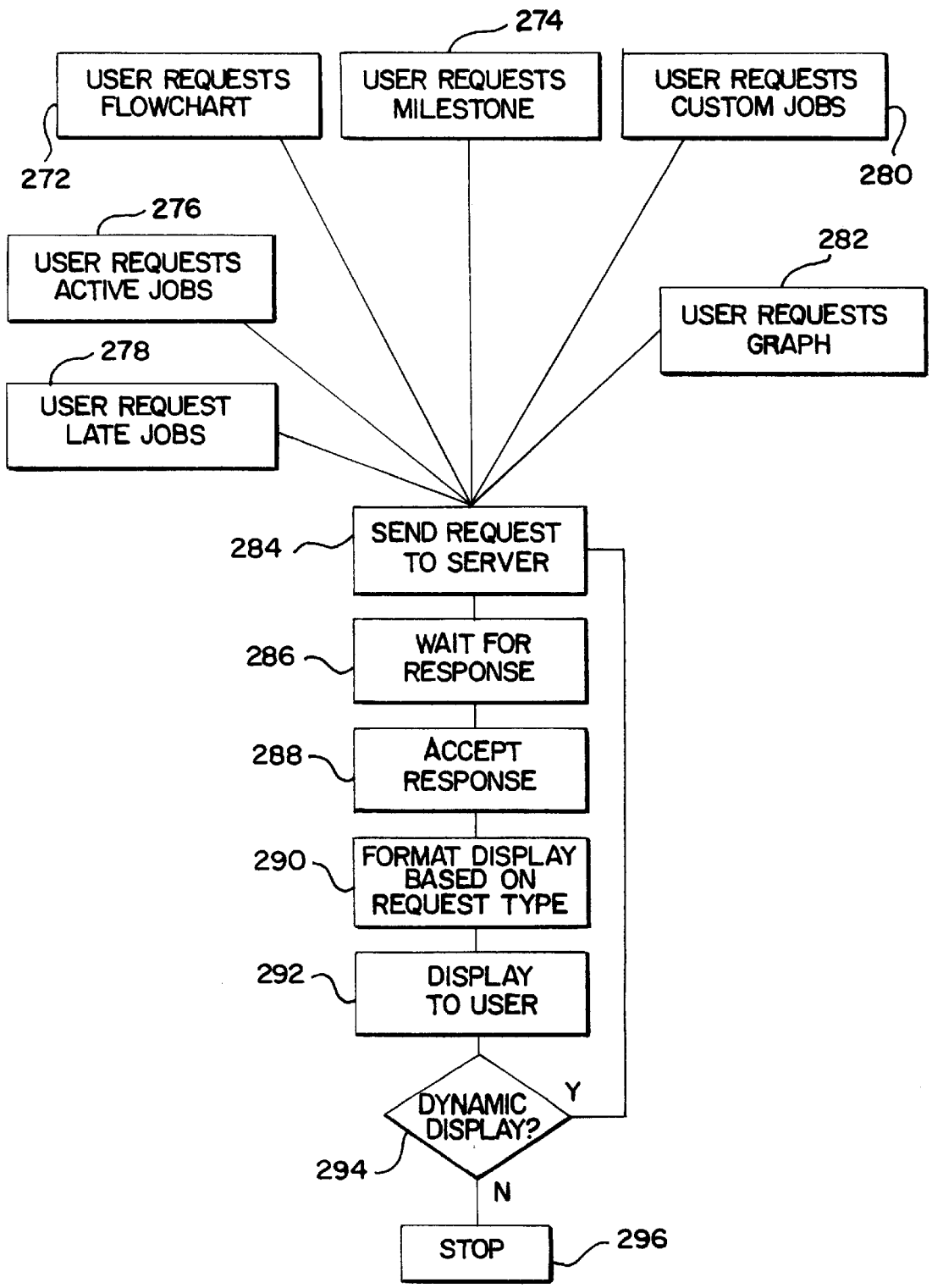
FIG. 2(b) shows response handling by the server.

Referring first to FIG. 2(*a*), a flowchart of the steps performed by the application server 18 are shown in the form of a computer flowchart. As illustrated, a number of requests can be made by the client PC's 22 for operations performed by or on the application server 18. For example, the client PC's 22 can request a flowchart 250, milestone chart 252, active jobs 254, late jobs 256, custom jobs 258 and/or graphical 260 display. The various client requests 250–260 are accepted at step 262 by the program running on the application server 18. At step 264, the program determines whether a valid user is operating a client PC 22. If not, the program stops processing the request at step 266. If a valid user is detected at step 264, a response is composed at step 268, which is sent to the client PC 22 at step 270.

The client side of the client/server interface is represented in FIG. 2(*b*). As those skilled in the art will appreciate, the system shown in FIGS. 2(*a*) and 2(*b*) represents an event-driven client/server computer environment. User requests 272–282 are received at the client PC's 22 from the users. The user requests 272–282 thus coincide with the client requests 250–260 illustrated in FIG. 2(*a*). Accordingly, a user can request a flowchart 272, milestone chart 274, active jobs 276, late jobs 278, custom jobs 280 and graphical 282 display. At step 284, the client PC 22 sends the user's request to the application server 18. The client PC 22 then waits for a response from the application server 18 at step 286. A response is received and accepted from the application server 18 at step 288. Based on the type of response, at step 290 the client PC 22 formats a proper display based on the user's request 272–282. The type of display requested is presented to the user on the client PC's display screen 26 at step 292. If the display type is a dynamically updated display (discussed below), the program loops back at step 294 to request to the application server 18 to continuously update the display. If the display is not a dynamic display, the program exits operation at step 296.

A flowchart of the function of receiving and storing messages from the mainframe computer 12 is illustrated in FIG. 2(*c*). As shown, messages are produced by the mainframe computer 12, which are normally directed to the mainframe console (not shown). At step 300, these mainframe console messages are detected and at step 302 pertinent messages are selected from the message stream. At step 304, the pertinent messages are inserted into and stored in a database. One presently preferred database to store the mainframe message stream is the Microsoft Corporation SQL database. At step 306, the monitoring computer 16 (FIG. 1) accepts those pertinent messages gleaned from the message stream 14. A determination of whether the message is a valid message is performed at step 308. Invalid messages are discarded at step 310. Valid messages are retained and used to update active jobs and history files at step 312. In either case, program flow loops back to step 306 where the monitoring computer 16 accepts further database inserts.

According to another aspect of the invention, a unique graphical user interface is provided for indicating the status of one or more computer processes to the user. According to the invention, information is provided about the production batch jobs scheduled through the CA/7 computer program made by Computer Associates, Inc. From such information, the system can generate flowcharts showing the status of one or more jobs or of the sub-systems they belong to. A run history for all jobs dating back to initiation of the system is thus available. This information can be displayed along with current information regarding the production batches that are executing on the mainframe computers 12. In the preferred embodiment, this information can be displayed in the graphical user interface through several formatted screen displays.

Figure 3A:
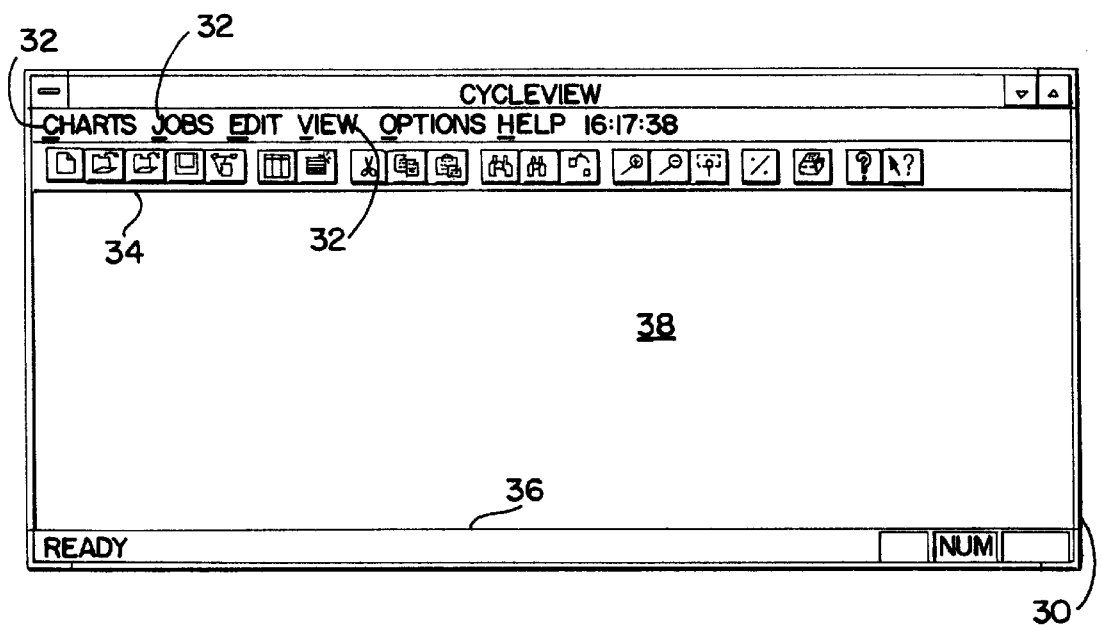
FIG. 3(a) shows a blank display screen and FIG. 3(b) illustrates the charts pull down menu.
Figure 3B:
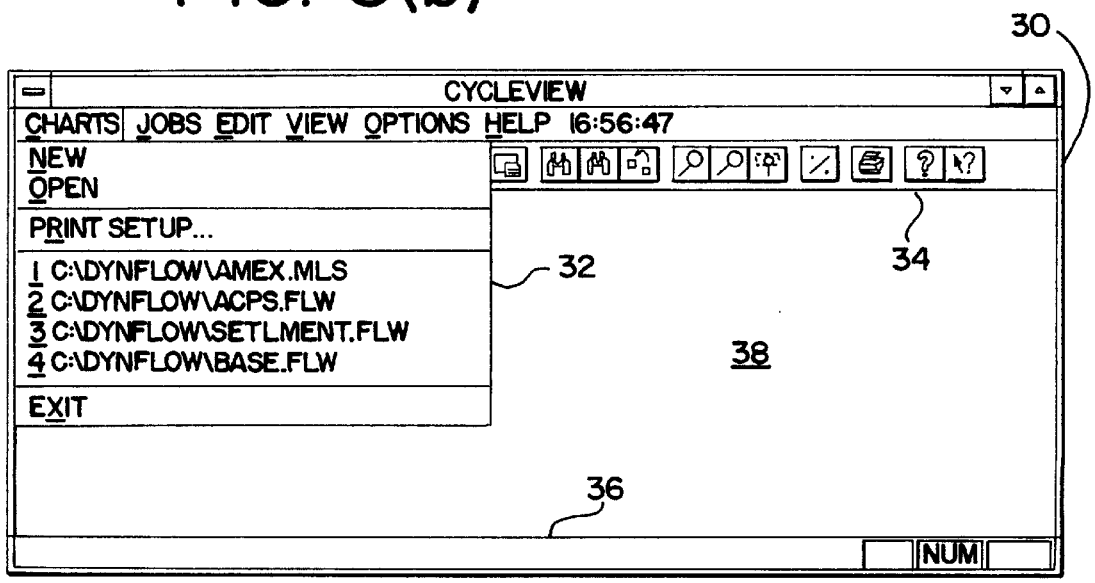

According to the preferred embodiment of the invention, a user initiates execution of the system by pointing a mouse (not shown) on an icon displayed in a window provided on the display screen 26 coupled to the client PC 22. The user then starts the program by "double clicking" on the icon in a manner known in the art. This process brings up a main screen 30 within the user interface shown in FIG. 3(*a*). As those skilled in the art will appreciate, the main screen 30 includes drop down menus 32, a tool bar 34 and status bar 36, along with a file display area 38. Through the main screen 30 the user can create a flowchart or view a flowchart that has already been created. As will be described in detail below, the flowchart is displayed in the file display area 38 provided in the main screen 30. An illustration of a drop down menu 32 for the "charts" function provided in the main screen 30 is shown in FIG. 3(*b*).

Figure 4A:
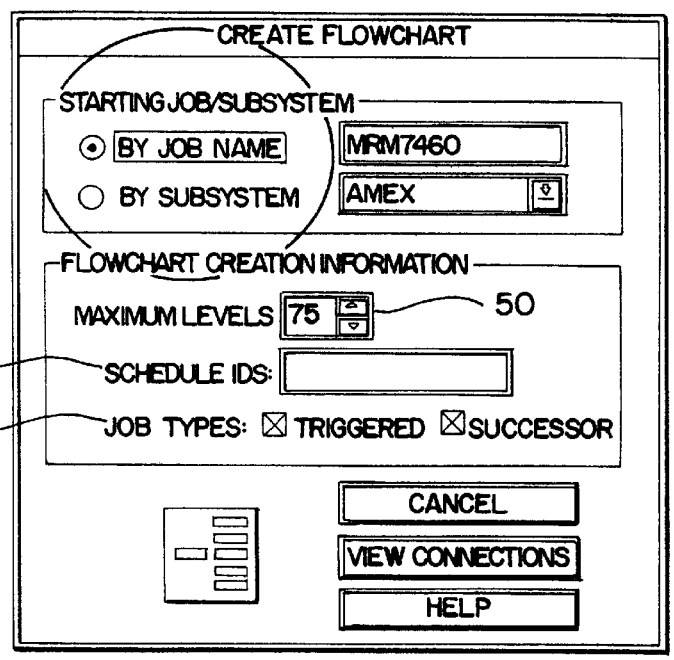
FIG. 4(a) shows the overall box, FIG. 4(b) highlights the starting job system and subsystem.
Figure 4B:
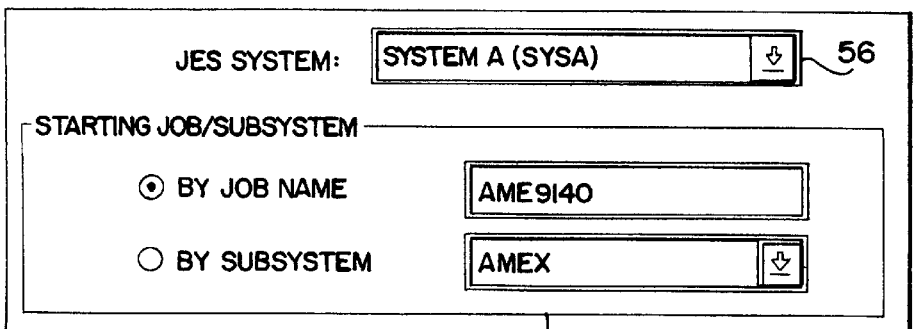
FIG. 4 shows a create flowchart dialog box where
FIG. 4(c) shows another application of the system and subsystem classifications.
Figure 4C:
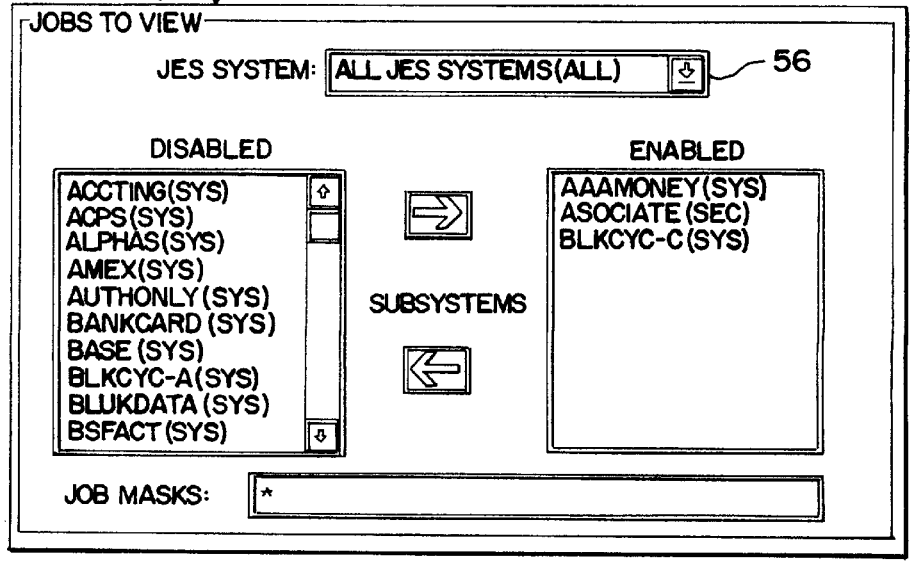

One presently preferred dialog box used to create a flowchart is shown in FIG. 4(*a*). As will be explained in more detail below, entering information in the create flowchart dialog box allows the user to create a flowchart for any computer process running or scheduled on the mainframe computers 12. The user can then access this flowchart later by double clicking on an icon in the manner described above.

As shown in FIG. 4(*b*), a drop-down window menu 56 is also provided in the create flowchart dialog box that allows the user or operator to select between one or more sources of computer processes. In the preferred embodiment of the invention, the drop-down window menu 56 is labeled "JES System:", and allows the user/operator to choose between two mainframe message streams. The message streams can be denoted either System A or System B corresponding to the SYS and SEC suffixes shown in FIG. 4(*c*). In the preferred embodiment, only one message stream can be selected at a time in order to prevent confusion or conflicts between different jobs bearing the same name but running on different mainframe systems. As those skilled in the art will appreciate, any number of different mainframe message streams can be treated in this manner. Nevertheless, as shown in FIG. 4(*c*), jobs for more than one mainframe system, including mainframe subsystems, can be displayed or viewed at a time. The dialog box shown in FIG. 4(*c*) is accessed through an icon provided in the tool bar 34.

Figure 5A:
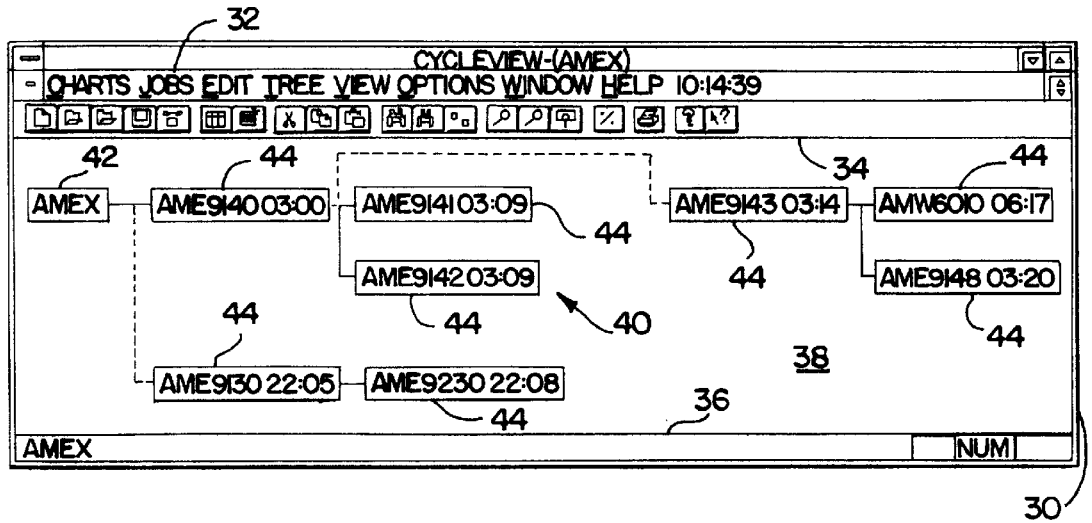
FIG. 5 illustrates one preferred flowchart display, where FIG. 5(a) identifies related jobs within a job flow and FIG. 5(b) provides additional information regarding a selected job.
Figure 5B:
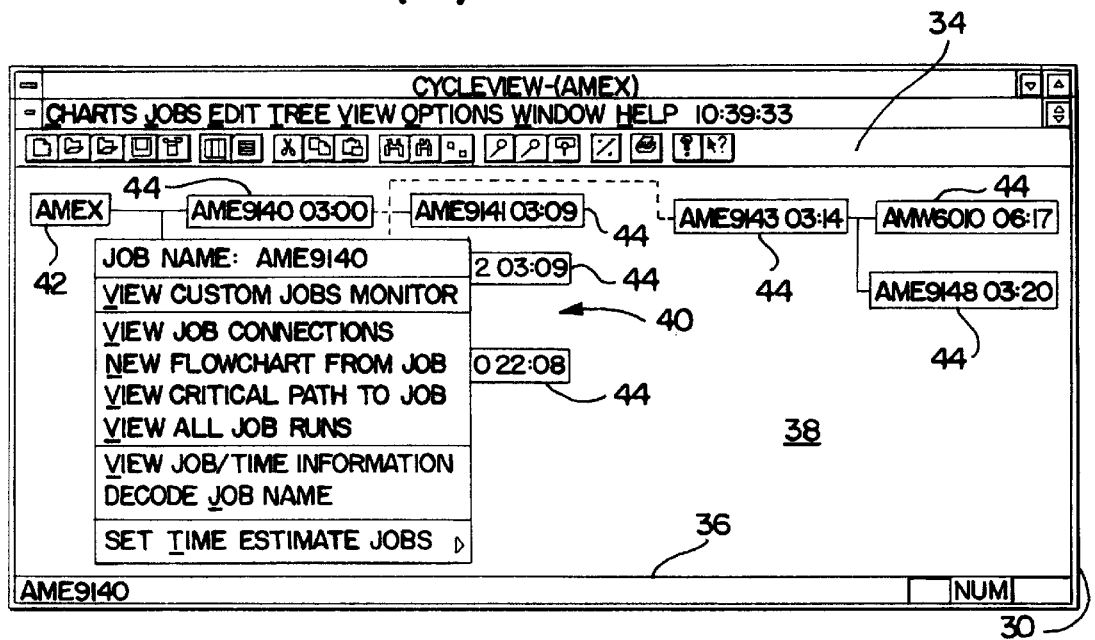

Referring now to FIG. 5(*a*), the system displays a flowchart 40 of the processes specified by the user in the file display portion 38 of the graphical user interface. The left most element 42 of the flowchart 40 is the name of the subsystem provided by the user. The objects 44 on the flowchart connected to this element 42 are batch jobs. Preferably, the names of each job 44 are provided on each of the boxes, along with the current average start time for the job 44. Color can be used to further identify a specific box or job 44. Moreover, by placing the mouse (not shown) over the specific job box and double clicking, additional detailed information is provided about that particular job, as shown in FIG. 5(*b*). The information displayed can include further commands to obtain yet additional information about that box or job 44.

As those skilled in the art will appreciate, the system also preferably allows the user to save a flowchart for later use or to print a flowchart, both in a manner generally known in the art. Additionally, the tool bar 34 is provided to summarize or provide short cuts to specific repetitive tasks executed using the system. The tool bar 34 presents these tasks as icons in a manner generally known in the art. According to the preferred embodiment, these icons can include the following functions: create new flowchart, open saved flowchart, open saved milestone chart, save the current chart, estimate time between points, start active jobs monitor, bring up custom jobs monitor, cut, copy, paste, find job, find next job, find parent job, zoom in, zoom out, box selection, percent complete, print, help, and context help. Those icons and functions unique to the present invention are discussed in more detail below.

The process of creating a new flowchart will now be discussed in more detail. One objective behind a flowchart is to illustrate computer jobs in their order of execution. A subsystem flowchart may include all of the jobs that are in a particular subsystem, as well as any other jobs that are included in the schedule so that all of the jobs in the subsystem will complete. In the preferred embodiment, therefore, the jobs themselves may contain programs from any number of related subsystems. Accordingly, a subsystem can comprise a set of functions that serve as business functions, such as charge backs, retrievals, etc. A given application program can thus perform functions in support of the particular business function, and thus be identified as part of a subsystem.

In order to simplify the display provided by the graphical user interface, several unique features are provided. Referring again to FIG. 4(*a*), one feature allows the user to specify the maximum number of levels 50 identified or displayed in a flowchart. By charting just two or three levels deep from a particular job 44, the user is able to follow a particular thread of information and cut down on the amount of information displayed at any one time. This results in flowcharts that generate very quickly and are more easily understood. Additionally, in some instances, the end job of a cycle may circle back to trigger the front job of a cycle. This can result in flowcharts that are artificially large and difficult to understand. The maximum level 50 control feature can be used to reduce the flowchart to a manageable visual level.

Schedule identification numbers 52 and job types 54 are also options provided in the dialog box shown in FIG. 4(*a*) for presenting more useful information in the graphical user interface. Schedule identification numbers 52 are provided by the preferred CA/7 computer program and correspond to particular days of the week, month and year. The job type 54 information can identify which jobs trigger other jobs, or which job is a successor to a previous job. A more detailed description of the use of job types 54 is provided below.

Figure 6:
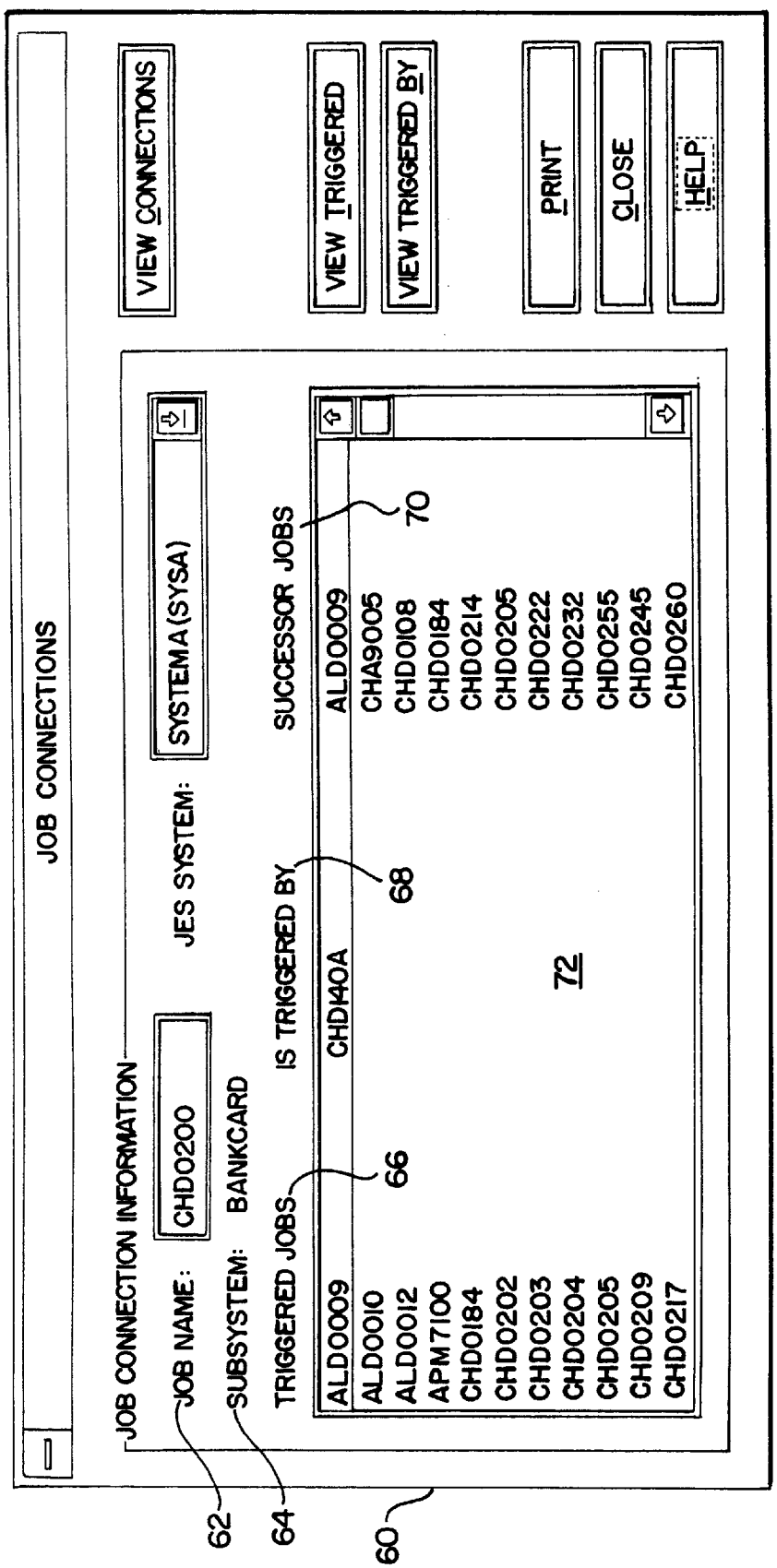
FIG. 6 shows a job connections dialog box.

Referring to FIG. 6, a user can quickly identify certain jobs without having to draw a flowchart. A job connections dialog box 60 is provided in FIG. 6. The dialog box 60 identifies three specific fields for a particular job name 62 and subsystem 64. These fields are triggered jobs 66, triggered by jobs 68, and successor jobs 70. Several jobs are shown in FIG. 6 by way of example. The relational aspects between these jobs are identified in the display field 72 shown in FIG. 6. The dialog box thus 60 provides a textual identification of the job connections expressed in a given flowchart. Preferably, a user can traverse backwards and forwards up and down the scheduling chain by selecting the jobs connected to the current job name 62.

Figure 7A:
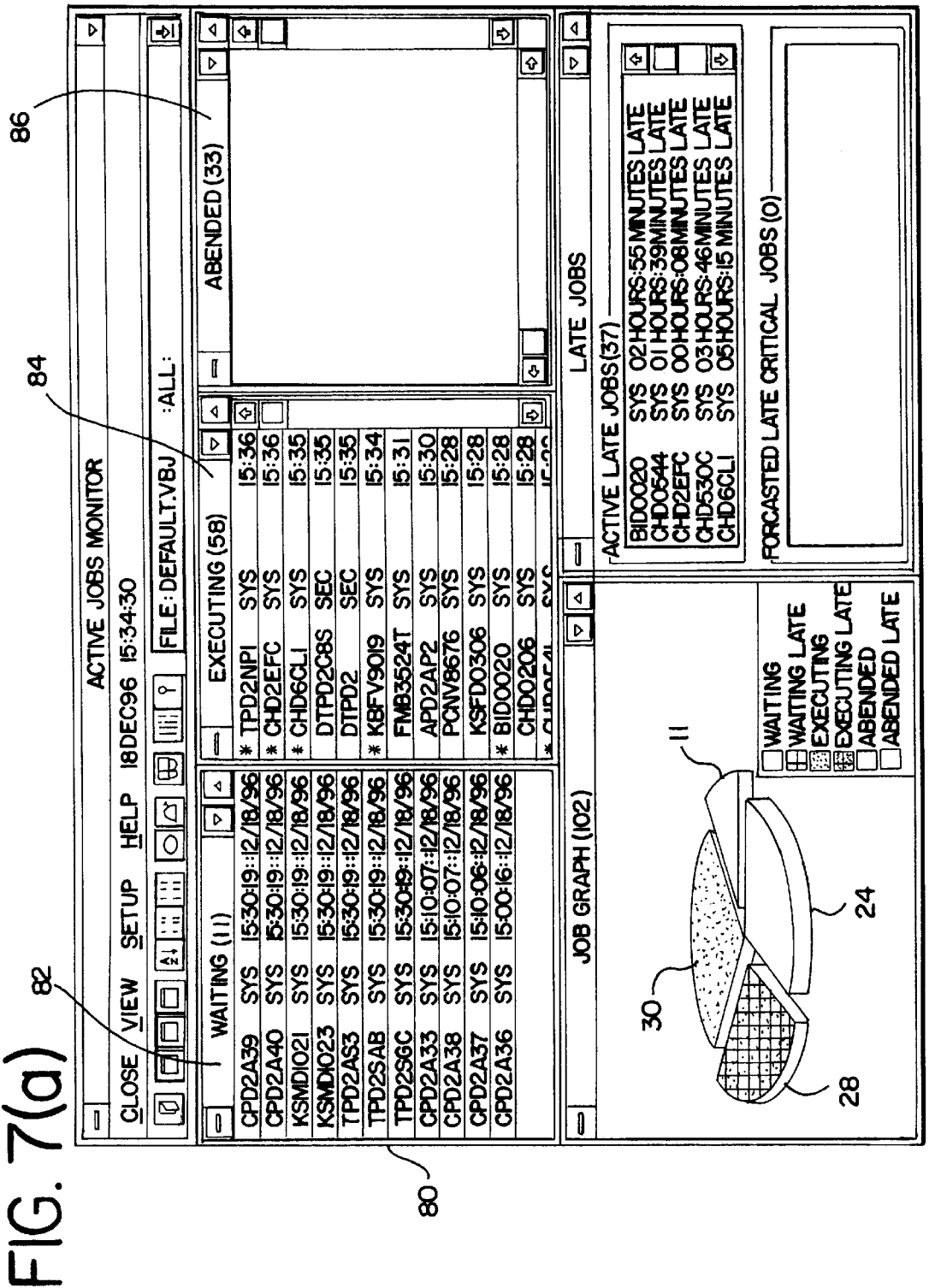
FIG. 7(a) shows an entire display screen and FIG. 7(b) highlights waiting, executing and abended jobs.

An alternate embodiment to the flowchart display format described above is the active jobs monitor display 80 provided in FIG. 7(*a*). Such a display 80 can report the status of all production batch jobs executing on all mainframe computers 12. Colors can also be incorporated into the display to identify the status of a particular job. As shown in detail in FIG. 7(*b*), three preferred status columns for batch jobs are displayed. These columns identify and list waiting jobs 82, executing jobs 84, and abended jobs 86. (The abended job status 86 displays jobs which have had an abnormal ending and are awaiting operator action to resolve any error.) In the preferred embodiment, waiting jobs 82 are identified in yellow, executing jobs 84 are identified in green and abended jobs 86 are identified in red in the display 80.

Figure 8A:
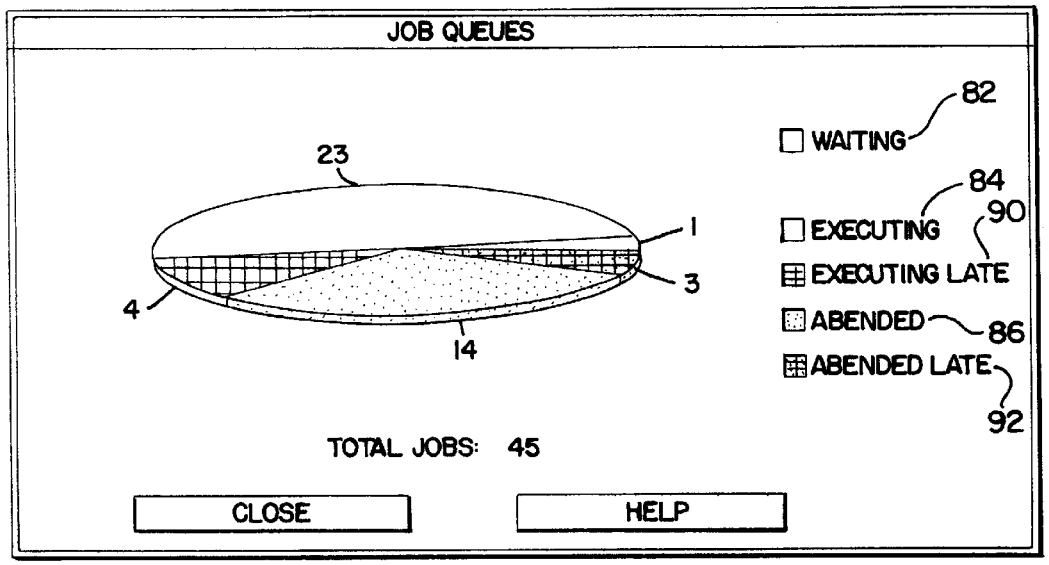
FIG. 8 illustrates the other dialog boxes shown in FIG. 7(a), where FIG. 8(a) highlights the job queues dialog box and FIG. 8(b) highlights the late jobs monitor dialog box.
Figure 8B:
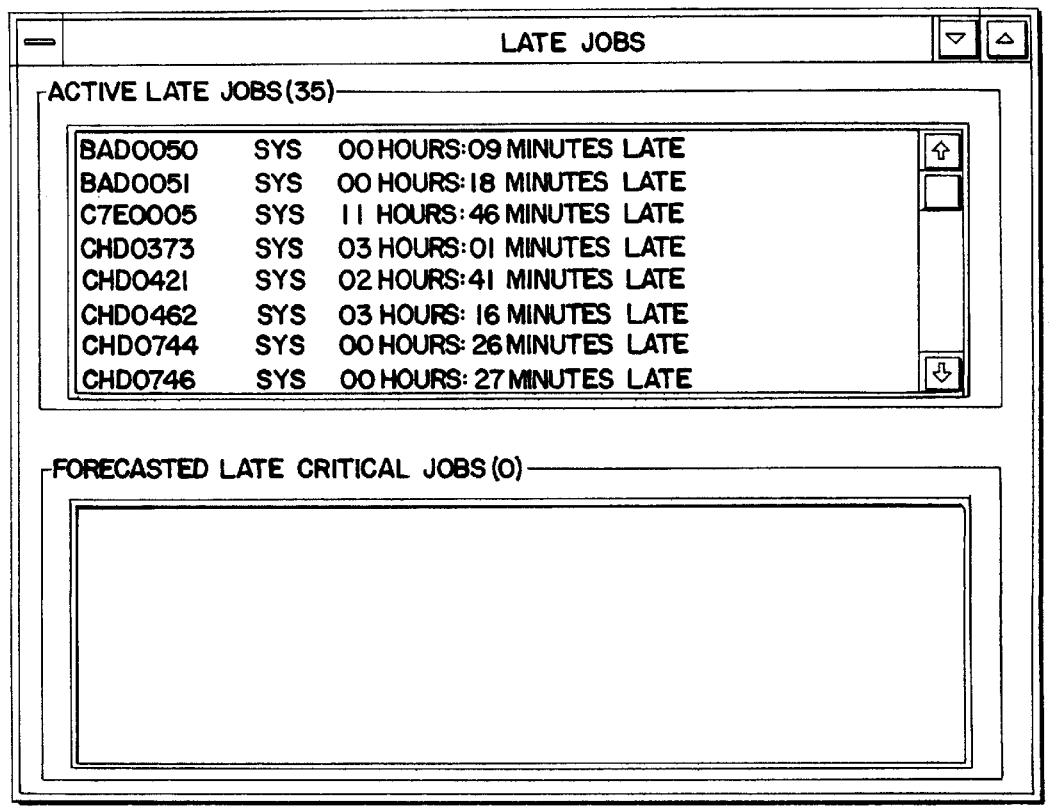

A graphical display of the active jobs monitor 80 shown in FIG. 7(*a*) is highlighted in FIG. 8(*a*). A pie chart of the job queue is thus visually presented to the user. Colors again can be used to identify job status, as mentioned above. Two additional status categories are shown in connection with FIG. 8(a), in addition to those shown in FIG. 7, to identify jobs that are executing late 90 and abended late 92. These categories are used to identify those jobs that have not completed by the average time in which that job was completed in the last five run times and is thus indicated as late. FIG. 8(b) highlights late jobs by listing both active late jobs 94 and forecasted late critical jobs 96. A custom jobs monitor can alternatively be created, as shown in FIG. 9, to specify and monitor a select set of jobs pertinent to a particular user.

From the above displays and data, product or process performance information can also be obtained and readily provided to the user. For example, as shown in FIG. 10, a dialog box can be created to provide daily statistics on a select set of jobs pertinent to a specific user. The job runs dialog box 100 shown in FIG. 10 preferably lists the history of all the runs for a particular job indicated in the job name field 102 that is provided in the lower left hand corner of the dialog box. As shown, this job name is also displayed in the left most column of the dialog box 100, along with columns for start date 104, start time 106, end date 108, end time 110, duration 112, and abend code 114.

Figure 11:
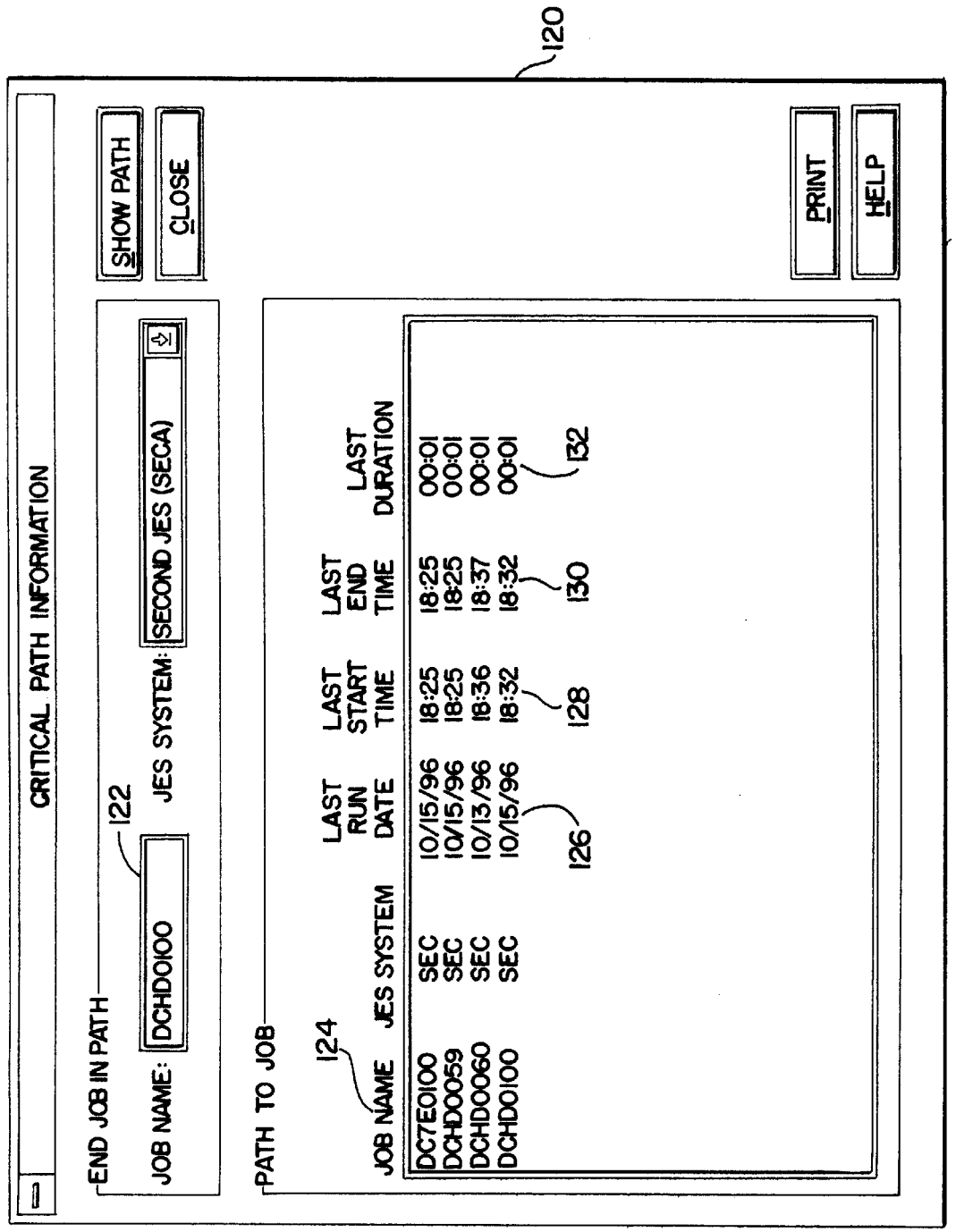
FIG. 11 shows a critical path information dialog box.

With the information presented in the job runs dialog box 100, a critical path information dialog box 120 can be readily created. A critical path information dialog box 120 is shown in FIG. 11. The critical path information dialog box 120 provides for each end job identified in the end job field 122, the job name 124 for all upwardly connected jobs, the last run date 126, last start time 128, last end time 130, and last duration 132.

Data regarding the amount of time required to progress between two jobs or points on a flowchart can be obtained and would be very useful to a user. Such information can be obtained when accessing the flowchart display and is presented along with the information provided when a user double clicks on a particular job box 44 (see FIG. 5(b)). Preferably, the user selects a starting point and an ending point on the flowchart, and the system calculates an estimate of the elapsed time required between the two end points. All of this information can also be presented to the user in a concise job information dialog box as shown in FIG. 12.

Figure 12:
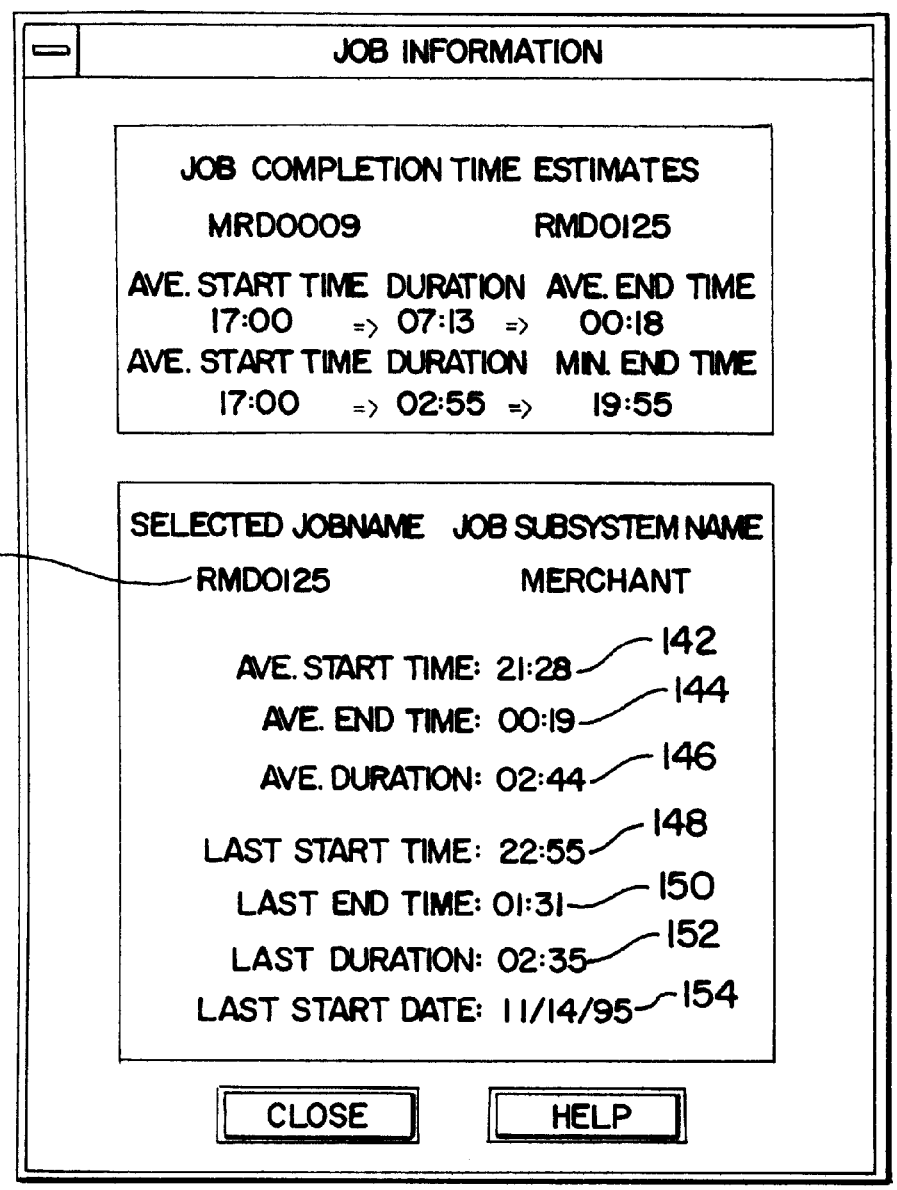
FIG. 12 shows a preferred job information dialog box.

Referring to FIG. 12, for a specified job name provided in the selected jobname field 140, the following information can be provided to the user. If job time completion estimates are desired, and the above end points have been identified by the user, an average start time 142, duration 144, and average end time 146 can be provided. In addition, a last start time 148, last end time 150, last duration 152, and last start date 154, can also be displayed to the user. Preferably, the average run data is obtained from a history of the last five runs for the identified job. The shortest run time observed in the last five runs is also provided.

In the preferred embodiment a user may also select part or all of a flowchart and copy it into a word processing program, such as Microsoft Word, or a graphics program, such as Microsoft Paintbrush. In addition, the preferred embodiment allows the user to "collapse" or "expand" parts of a flowchart to eliminate or include sections of an overall flowchart that present particular concern. In this respect, certain branches can be highlighted that refer to additional jobs and/or branches of such a flowchart. Further, the preferred tool bar 34 (FIG. 3) allows the user to quickly zoom in and zoom out of a particular view, or automatically size an entire flowchart to fit into a current window.

In another aspect of the invention, a milestone chart can be used as a monitoring tool to allow the user to graphically monitor jobs and receive alerts when job performance is outside of specified criteria. In the preferred embodiment, the alerts can be provided on a screen message or a beeper system such as the message board system 24 shown in FIG. 1. One presently preferred embodiment of a milestone chart is shown in FIG. 13.

Figure 13:
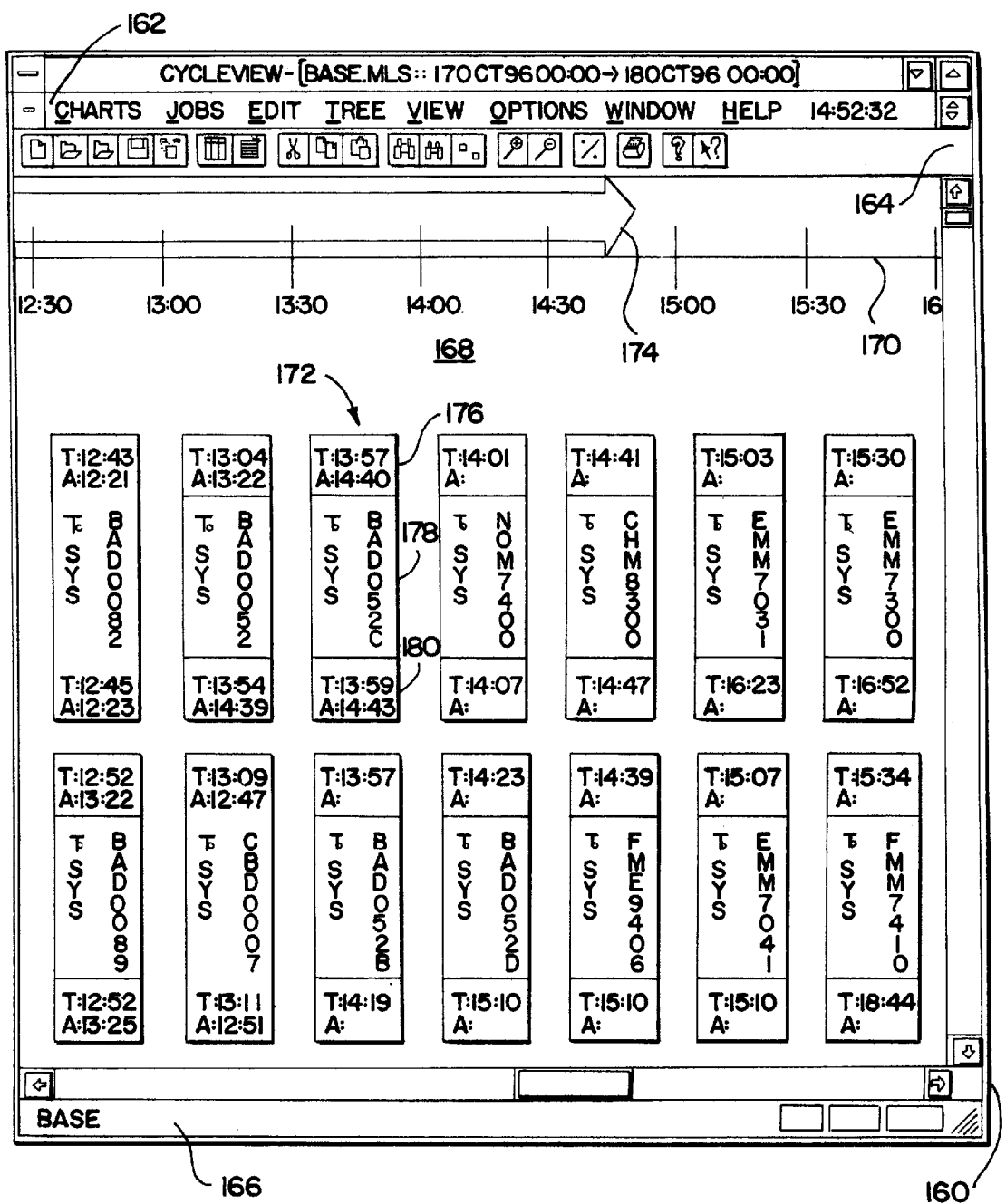
FIG. 13 illustrates one presently preferred milestone chart display.

Referring to FIG. 13, the preferred milestone chart window 160 includes similar drop down menus 162, a tool bar 164 and status bar 166 that are included in the flowchart display, as well as a file display area 168. Moreover, the milestone chart includes a time line 170 and one or more milestones 172. The time line 170 preferably includes an arrow 174 pointing to the current time of the day. Each milestone 172 is preferably divided into three parts. The top part 176 identifies the start time for the job identified in the milestone 172. Preferably, two times are provided, a target time and an actual time. The center of the milestone 178 identifies the name of the job that is tied to that particular milestone. The bottom of the milestone 180 identifies the end times for the particular milestone. Preferably, a target end time and an actual end time are specified. The status of each milestone 172 is preferably reflected by color as it relates to the time line 170, as shown in FIG. 13.

As used above in connection with other aspects of the invention, color can also be employed in association with the milestone charts. For example, according to the presently preferred embodiment of the invention, the color orange is employed to identify when the execution of a milestone job is outside the specified target parameters. The colors black or green are used to identify normal operation. The color white is used to identify milestones that have yet to be completed. In addition, these colors can be associated with or replaced by other forms of alerts provided to the user such as audible tones or the like (see FIG. 1).

The system also preferably allows the user to create or display milestone charts. One preferred method for quickly creating a milestone chart is to save a flowchart in the form of a milestone chart. The system allows the user to make this translation by including built-in programming to achieve this conversion. As those skilled in the art will appreciate, the conversion can be achieved though a command menu (not shown) or a function button (not shown). Milestone charts can also be created manually by providing the names of the jobs desired.

Referring to FIG. 14, one presently preferred dialog box 190 is shown for adding or modifying a milestone. Fields are provided in the dialog box 190 for milestone information 192, alert information 194 and history information 196. Within the milestone information field 192, a milestone name 198, triggering job name 200, target start time 202, target end time 204, and minutes late 206 fields are provided. In the alert information field 194, the alert type 208, a telephone number 210 for outside contact, and alert message 212 fields are provided. In the history information section 196, last start 214, average start 216, last end 218, and average end 220 fields are provided.

According to the preferred embodiment of the invention, the system automatically accesses the history database to provide the average times out of the last five runs for the target start time 202 and target end time 204 fields. In the alert type field 208, options (not shown) are provided for either a display message or telephone beeper notification, or to disable this feature. If the telephone beeper notify option has been selected, a telephone number can be provided in the telephone number field 210. According to the preferred embodiment, the telephone number will be automatically dialed and a message sent alerting the user to the particular situation requested. As shown in FIG. 14, the alert message can comprise "CHD0100 is late!"

A milestone chart editor is provided in the graphical user interface, as shown in FIG. 15. As discussed above, a milestone name field 230, trigger job 232, target start 234, target end 236, alert delay 235, and action type 240 fields are provided in the milestone chart editor. One or more milestone names can be displayed textually in the milestone editor as shown in FIG. 15. (A similar editor can be created for the flowchart display described above.)

Figure 16A:
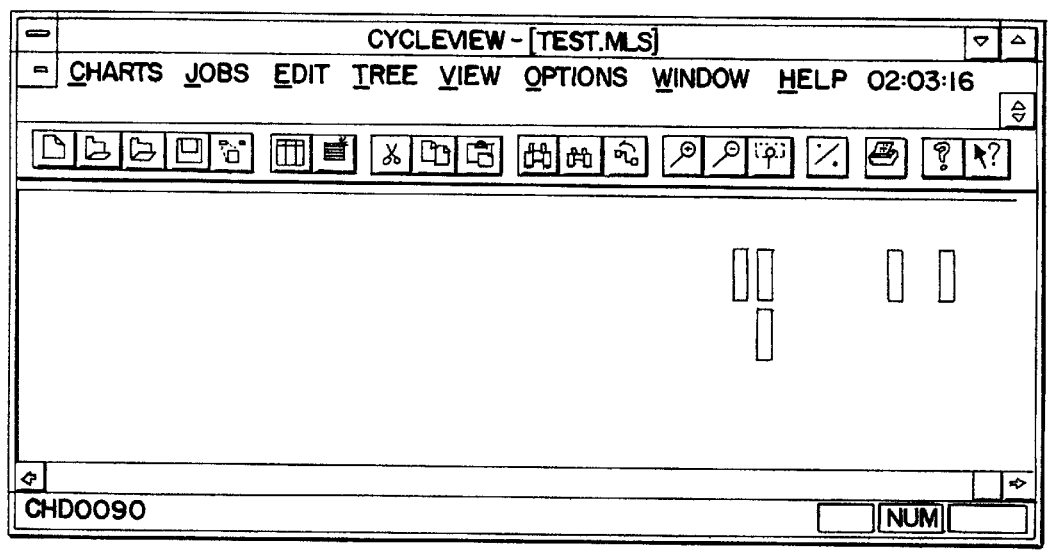
FIG. 16(a) shows several milestones scheduled for execution and FIG. 16(b) identifies additional information provided for each milestone.
Figure 16B:
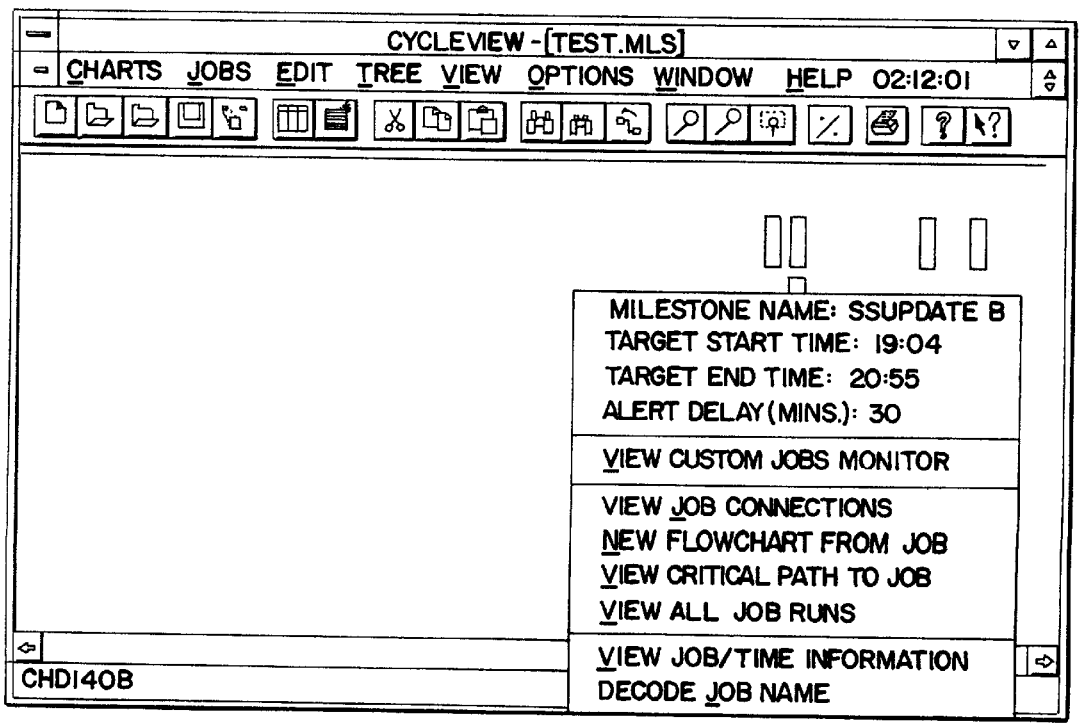
FIG. 16 illustrates a milestone chart overview, where

As with the flowchart display, an entire milestone chart can preferably be displayed at one time to the user. Such display is shown in FIG. 16(*a*) and allows the user to observe all of the milestone chart entries currently being observed for the particular system. Although textual information may be too small to observe in this overall display, color can be used to quickly communicate the status of particular jobs. Thus, the user can tell at a glance what areas of the overall milestone chart bear further investigation and what areas appear to be executing properly.

To obtain further information about a milestone 172 displayed in FIG. 16, the user could double click on the relevant portion of the display. One presently preferred example of the information provided by the system is shown in FIG. 16(*b*). Like the flowcharts, a job information dialog box can also be created for information regarding milestones. Other forms of information can be provided as those skilled in the art will appreciate, for example, by providing a summary of the results of a milestone chart on a daily, weekly, monthly or other time basis.

Figure 17:
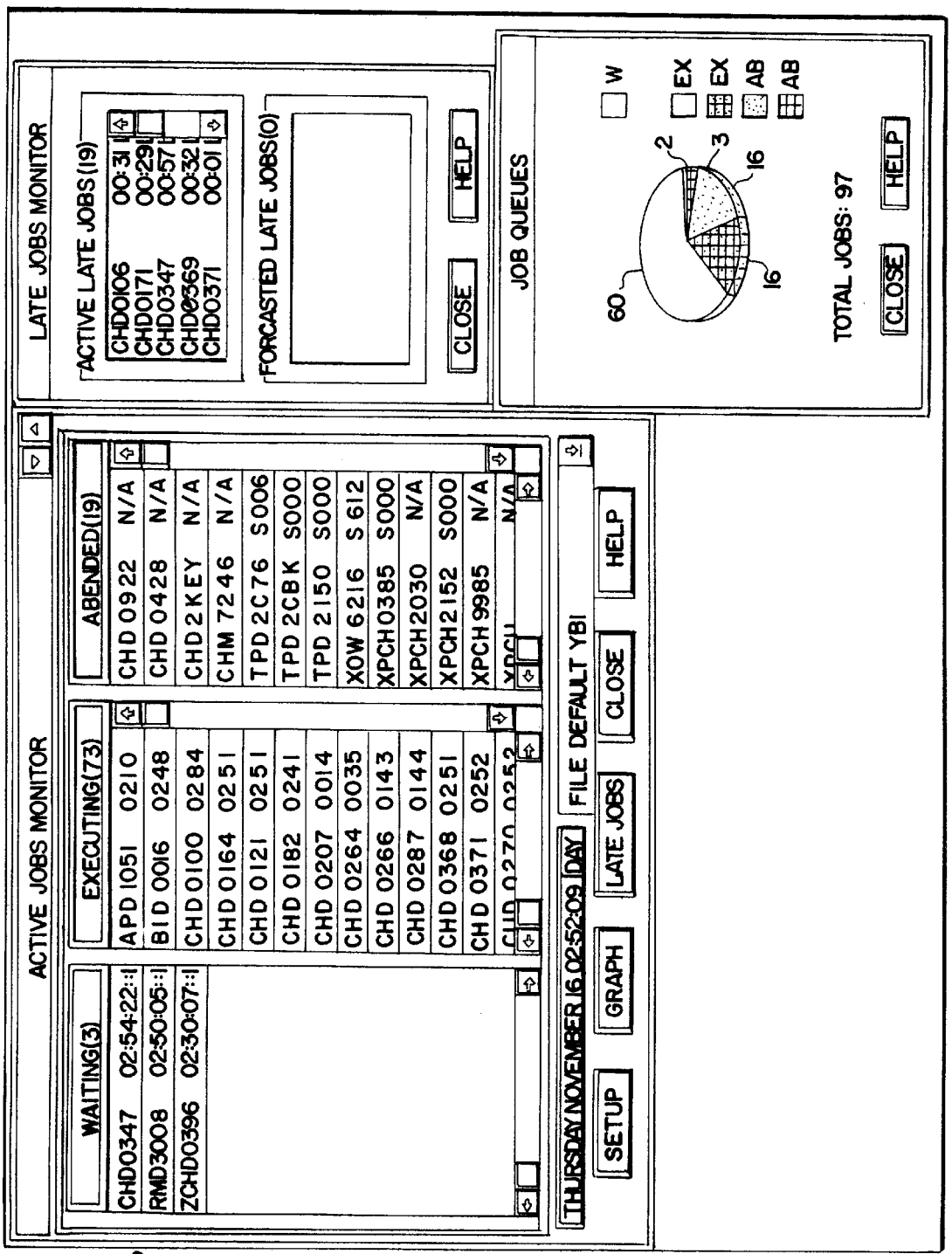
FIG. 17 illustrates a job monitor suite display.

One presently preferred embodiment of the graphical user interface employs a batch monitoring suite of displays shown in FIG. 17. The batch monitoring suite includes the active job monitor (see FIG. 7(*a*)), the late job monitor dialog box (see FIG. 8(*b*)), and the job queues chart (see FIG. 8(*a*)). In this display suite, much significant information about the status of the many processes executing on a given computer can be viewed through a single screen display. Preferably, this display, like the other displays discussed above, updates itself automatically on a timer interval. The timer interval can be selected by the user. The angle of the graph shown in the job queues chart display can also be specified. The late jobs monitor dialog box shown in FIG. 8(*b*) identifies those jobs that are running later than their recent average, which might generate an alarm condition.

As can be seen, the present invention provides a unique system and method for indicating the status of one or more processes running on a computer system. The invention provides the status in a graphical format to the user to allow for early observation. Moreover, the status of one or more batch or online processes is provided and updated in real-time to provide up to the minute status information. Automatically tracking and displaying the status of each process is much simpler and easier than the prior manual methods. In addition, as the number of processes executing on a computer increases, and the complexity of monitoring or tracking their status is thus magnified, the present invention readily provides such status regardless of the complexity of the system.

In the preferred embodiments of the invention, colors are employed to immediately or quickly identify the status of a particular process. Both flowcharts and milestone charts can be employed to identified individual or groups of processes. The flowcharts and milestone charts provide both status information as well as information about the relationships between one or more processes.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of this invention.

We claim:

1. A system for communicating the status of at least one batch process executing on a mainframe computer, comprising:

a mainframe computer, the mainframe computer having a central processor for executing at least one batch process initiated from at least one user;

means coupled to the mainframe computer for tracking the status of the at least one batch process and generating in real time a signal indicative of the status of the at least one batch process;

a means for establishing a communications link from the at least one display to the means for tracking the status of the at least one batch process; and at least one display, the display coupled to receive the signal indicative of the status of the least one batch process and graphically display in real time the status of the at least one batch process to the user.

2. The system defined in claim 1, wherein the at least one batch process comprises a plurality of batch processes initiated by at least one user.

3. The system defined in claim 1, wherein the status of the at least one batch process identifies whether the process has initiated execution, completed execution or aborted execution.

4. The system defined in claim 1, wherein the mainframe computer further comprises an output for communicating a signal stream of mainframe status.

5. The system defined in claim 1, wherein the signal indicative of the status of the batch process is generated by monitoring the signal stream communicated by the mainframe computer.

6. The system defined in claim 1, wherein the graphical display comprises an execution history flowchart.

7. The system defined in claim 1, wherein the graphical display comprises a milestone chart.

8. A system for communicating the status of at least one batch process executing on a central computer, comprising:

a central computer, the central computer having a central processor for executing at least one batch process initiated from at least one user, and an output port for communicating a signal stream of central computer activity;

means for monitoring the signal stream of central computer activity to present an indication of processing activity in real time;

a communications link coupled to the means for monitoring, the communications link communicating a signal containing the indication of processing activity;

means coupled to the communications link for receiving the indication of processing activity and creating a graphical representation of processing activity; and a remote computer coupled to the means for receiving, the remote computer receiving the graphical representation and having a display, the display for presenting to the user in real time the status of the at least one batch process.

9. The system defined in claim 8, wherein the signal stream of central computer activity is parsed and processed to present the indication of processing activity.

10. The system defined in claim 8, wherein the central computer comprises a plurality of distributed computer systems and execution of the at least one batch process is distributed across the plurality of distributed computer systems.

11. A method for communicating the status of at least one batch process on a mainframe computer, comprising the steps of:

providing a mainframe computer, the mainframe computer having a central processor for executing at least one batch process initiated from at least one user;

tracking the status of the at least one batch process;

generating in real time a signal indicative of the status of the at least one batch process;

receiving the signal indicative of the status of the least one batch process; and graphically displaying in real time the status of the at least one batch process to the at least one user.

12. The method defined in claim 11, wherein the step of tracking the status of the at least one batch process comprises the steps of tracking a plurality of batch processes initiated by at least one user.

13. The method defined in claim 11, further comprising the steps of identifying whether the at least one batch process has initiated execution, completed execution or aborted execution.

14. The method defined in claim 11, further comprising the step of communicating a signal stream of mainframe status.

15. The method defined in claim 11, further comprising the step of monitoring the signal stream communicated by the mainframe computer to generate the signal indicative of the status of the batch process.

16. The method defined in claim 11, further comprising the step of graphically displaying a flowchart.

17. The method defined in claim 11, further comprising the step of graphically displaying a milestone chart.

18. A method for communicating the status of at least one batch process executing on a central computer, comprising:

providing a central computer having a central processor for executing at least one batch process initiated from at least one user;

communicating in real time a signal stream of central computer activity;

monitoring the signal stream of central computer activity to present in real time an indication of processing activity;

communicating a signal containing the indication of processing activity;

receiving the signal containing the indication of processing activity;

creating a graphical representation of processing activity; and presenting to the at least one user the status of the at least one batch process.

19. The method defined in claim 18, further comprising the steps of parsing and processing the signal stream.

20. The method defined in claim 18, wherein the step of providing a central computer comprises the step of providing a plurality of distributed computer systems wherein execution of the at least one batch process is distributed across the plurality of distributed computer systems.

21. A system for communicating the status of at least one process executing on a computer, comprising:

a server, the server having a central processor for executing at least one process initiated from at least one user, and an output port for communicating a signal stream of server activity;

means for monitoring the signal stream of server activity to present a real time identification of processing activity;

a communications link coupled to the means for monitoring, the communications link to communicate a signal containing the identification of processing activity;

means for receiving the identification of processing activity and creating a graphical representation thereof; and a client computer coupled to the communications link and having a display, the client computer receiving and displaying on the display the graphical representation of the status of the at least one process, wherein the receiving and displaying is performed in real time.

\* \* \* \* \*